Patented Dec. 12, 1944

2,364,632

UNITED STATES PATENT OFFICE 2,364,632

WAX EMULSIONS

James Otis Handy, Orlando, Fla., assignor to Duzzel Corporation, Dover, Del., a corporation of Delaware No Drawing. Application April 18, 1942,
Serial No. 439,563

9 Claims. (Cl. 99—168)

This invention relates to improved compositions for protectively coating fresh fruits and vegetables to prevent decay, withering or shrinking. It relates more particularly to an improved wax emulsion and to a process of making wax emulsions for protectively treating fresh fruits and vegetables.

It is well known that citrus fruits begin to shrink and wither in a comparatively short time after picking and it is common practice, after washing the fruit, to apply a protective coating of wax or waxes, by spraying or otherwise, in order to delay the shrinkage.

There has not been, heretofore, available to the packers of fruits and vegetables, a wax emulsion which simultaneously creates on fruit surfaces a permanent and attractive gloss and also slows down the normal drying-out process so that, when marketed, the coated products are almost as fresh in appearance as they were immediately after they were coated.

Paraffin wax has been used for making fruit-coating emulsions but it has its limitations in that its emulsions are milky, having a very coarse particle-size so that the coatings are relatively thick and the "feel" of the coated product is unpleasant. Permanent gloss is not possible and the appearance of the fruit is dull. Carnauba wax has also been used, being harder and more easily emulsified to fine particle-size. It is, however, relatively scarce and is brittle, so that it requires added bonding material to make its emulsion coatings coherent and adherent.

My invention relates particularly to a new wax composition and a process for making the same so that the emulsion will not only delay shrinkage and withering but will possess good wetting properties and will provide the desired luster after it has dried. I have found after many experiments over a considerable period of time that candelilla wax can be used to make a more lustrous protective coating for fruit than any heretofore known.

I have found that the stickiness of films containing candelilla wax is, in part, due to constituents of the wax and, in part, to unwise methods and improper materials used in compounding candelilla wax emulsions. The methods used have failed to produce sufficiently fine wax particle-size because of unsuitable means of emulsification and improper compounding materials which have been used. Stickiness has thus been enhanced rather than eliminated.

The source of stickiness inherent in candelilla wax is found in the free acid bodies, chiefly melissic acid, which the wax contains. Its "acid number" varies from 10 to 20. This means that, in order to neutralize the acids in one gram of candelilla wax, it is necessary to add from 10 to 20 milligrams of potassium hydroxide or an equivalent amount of some other suitable alkali. When these acid bodies are properly neutralized and saponified, I find that the stickiness of candelilla wax emulsion films largely disappears, leaving only enough to make a close-textured, coherent and adherent film.

I find that I can emulsify a small amount of paraffin with candelilla wax and at the same time obtain an emulsion which is permanently transparent. This indicates a finer particle-size for emulsified paraffin than has heretofore been obtained. For my purposes, however, I do not require more than one-fifth to one-tenth as much of paraffin as of candelilla wax. The paraffin functions as a binder and adds to the shrinkage control of the emulsion film.

As emulsifiers, I use oleate and stearate soaps of sodium or potassium or of the organic bases such as the ethanolamines, preferably monoethanolamine, and morpholine, etc. These approved organic bases have the desirable property of forming oil-soluble soaps.

My discovery consists, in part, in the art of producing a stable emulsion consisting of candelilla wax or of candelilla wax with a minor quantity of paraffin with oleate and stearate soaps, preferably nascent, while simultaneously neutralizing all acid bodies in the candelilla wax and dispersing and utilizing the soaplike bodies resulting from the neutralization. It also consists in application of my discovery that the alkali solution used as saponifying agent must not be added in any substantial amount under nor in excess of the quantity equivalent to the fatty acids in the batch and to the melissic and other acids in the candelilla wax.

The candelilla wax may be "single-refined," variously called "crude" or "prime" or it may be double-refined and may constitute from 15% to 20% of the emulsion, containing a total of 25% solids. The fatty acids, preferably stearic and oleic, may constitute from 2 to 5% of the emulsion, preferably between 3 and 4%. The stearic acid may be "single," "double," or "triple-pressed." The oleic acid may be the commercial grades of "red oils" containing from five to fifteen percent of stearic acid. The saponifying agent may be, preferably, sodium hydroxide (commercial caustic soda), or potassium hydroxide, or monoethanolamine, or morpholine. Diethanolamine or triethanolamine may be substituted for monoethanolamine but with inferior results.

If paraffin is employed, it may be of good commercial grades varying from 120° to 140° F. in melting point. The amount used may vary up to 5%, preferably from 2 to 3%.

A representative formula for my emulsion, together with directions for manufacture of a 50-gallon batch, follows:

| | Pounds |
|---|---|
| Candelilla wax (double-refined) | 79 |
| Paraffin (M. P. 135° F.) | 10 |
| Stearic acid (triple-pressed) | 11.2 |
| Oleic acid (red oil) | 2.8 |
| Sodium hydroxide, 95% (caustic soda) | 3.0 |
| Water to make 50 gallons. | |

The emulsion contains 25% solids.

The following procedure will produce my improved emulsion.

Melt together at 190° to 210° F. in a suitable, preferably steam-jacketed, kettle, the waxes and the fatty acids. The caustic soda contains usually about 95% of sodium hydroxide so that three pounds of it contain 2.85 pounds of sodium hydroxide. Dissolve this amount in one gallon of water and make it up to 2⅛ gallons giving a 4N solution. Each gallon then contains 1.34 pounds of sodium hydroxide.

At this concentration and approximately within the temperature range the saponifying base unites at once with the added fatty acids and with the melissic and other acids of the candelilla wax forming soaps which, in turn, emulsify the waxes to a transparent jelly or viscous syrup which may then be slowly and carefully diluted with hot water to the desired degree.

The concentration of the soda solution is more or less critical. If the concentration is too high, the jellifying action will not take place and if the concentration is too low the action is delayed and the result is uncertain.

It is important also that all acids should be neutralized and saponified. Otherwise, a clear product may not be obtained in which the extremely fine particle-size of the waxes when dried on fruit, makes a transparent lustrous film.

If the saponifying agent is used in material excess of the amount required for neutralization of the acids, the power of the emulsion to control shrinkage of citrus fruit will be impaired, due perhaps to the destructive action of the free alkali on the texture of the film. My films have far greater shrinkage control than films containing even small amounts of free alkali.

If the temperature of the solution of the saponifying agent much exceeds 160° F. and it is added rapidly the heat of reaction with the fatty acids may cause foaming and loss of material and rejection of the batch. If the alkali solution is added at too low a temperature, it causes local freezing and delay, at best. The solution should be added in a small but steady stream and with constant and efficient stirring. Usually, several minutes are required in this part of the process and success may be gauged by the clearness of the resulting jelly.

It is desirable also to add water slowly at first then at greater speed, stirring actively all the time. The easily stirrable jelly becomes stiffer when the primary emulsion of soap solution in the waxes changes to an emulsion of the waxes in the soap solution. It is then possible to add the water rapidly while stirring vigorously. Preferably the stirring is done by a mechanical device in which horizontally projecting arms on geared vertical shafts intermesh and break up and disperse the stiff jelly. When the water constitutes 75% of the batch the emulsion has been sufficiently thinned. It contains 25% of solids and may be stored in barrels or tanks.

For use in application to fruit, this 25% emulsion may be diluted to 2 or 3% solids. When sprayed on fruit, or when fruit is immersed in it and then drained, the coating dries to a transparent, coherent, adherent, glossy film with high shrinkage control.

When, in candelilla wax emulsion making, monoethanolamine is used for neutralization and saponification of fatty acids and of melissic acid any other acids naturally present in candelilla wax, formulae which have shown stability for a considerable period of time are as follows:

| | B | C |
|---|---|---|
| | Percent | Percent |
| Candelilla wax | 10.3 | 10.3 |
| Paraffin | 2.4 | 2.4 |
| Stearic acid | 3.5 | |
| Red oil | | 4.07 |
| Monoethanolamine | 1.8 | 1.8 |
| Water to make 100 gm. in each batch | | |

The concentration of solids may be increased to a total 40% greater than is shown above by proportional increases in all of the materials used except water which is decreased correspondingly.

While the preferred modifications of the invention have been described, it is to be understood that these are given merely as examples and I do not wish to limit myself to these precise details. It will be appreciated that within the scope of the concepts herein set forth, other and specifically different but equivalent substances may be used to form an emulsion which functions in an analogous manner. All such modifications or extensions which are included within the scope of the appended claims are considered to be comprehended within the spirit of the invention.

What is claimed is:

1. Process of preparing an emulsion for application to fruit and vegetables to enhance luster and control shrinkage and decay which consists in melting candelilla wax and fatty acids at a temperature of from 190° to 210° F., adding thereto an aqueous solution of a saponifying agent to saponify all of the added fatty acids and the acids existing in the wax and agitating the mixture to form a jelly-like emulsion.

2. Process of preparing an emulsion for application to fruit and vegetables which consists in melting candelilla wax and fatty acids at a temperature of from 190° to 210° F., and adding thereto slowly in regulated amounts approximately a 4N solution of caustic soda in quantity sufficient to saponify all of the added fatty acids and the acids existing in the candelilla wax and agitating the mixture to form a jelly-like emulsion.

3. Process of preparing an emulsion for application to fruit which consists in melting candelilla wax and fatty acids and alkali at a temperature of from 190° to 210° F. to saponify all of the added fatty acids and the acids existing in the candelilla wax and agitating the mixture to form a jelly-like emulsion and adding water to said emulsion to convert the same into a liquid emulsion.

4. In the process of preparing an emulsion for application to fruit the step which consists in heating candelilla wax, fatty acids and alkali, the alkali being in an amount sufficient to saponify the added fatty acids and to neutralize the acids naturally existing in the candelilla wax without excess of free alkali in the emulsion.

5. The process of preparing an emulsion for application to fruit which consists in melting candelilla wax and fatty acid and an aqueous solution of a saponifying agent in which the water content is sufficient to permit reaction with the saponifying agent of the fatty acid and the acids of the candelilla wax, adding water gradually until the point of primary emulsification of water and soap in wax changes to wax in water, and then diluting with water to produce an emulsion having a predetermined solid content.

6. The process of preparing an emulsion for application to fruit and vegetables which consists in melting candelilla wax, paraffin and fatty acid, adding an aqueous solution of a saponifying agent in which the water content is sufficient to permit reaction with the saponifying agent of the fatty acid and the acids of the candelilla wax to form a jelly-like emulsion and then adding water gradually until the point of primary emulsification of water and soap in wax changes to wax in water and then diluting with water to produce a liquid emulsion having a fine particle-size and stability and a predetermined solid content.

7. The process set forth in claim 1 in which 1% to 3% of paraffin is added to the candelilla wax.

8. A coating composition for fresh fruits and vegetables having approximately the following composition: alkali neutralized candelilla wax from 15% to 20%; paraffin from 1% to 3%; stearic and oleic soap from 2.5% to 7%.

9. A process of treating perishable fruit and vegetables to enhance the luster and control the shrinkage and decay thereof which comprises applying to the surface to be treated an emulsion containing alkali neutralized candelilla wax with an admixture of a relatively small amount of paraffin, said waxes being of extremely small particle-size and forming a transparent, coherent, adherent and glossy film on the surface when dried thereon.

JAMES OTIS HANDY.